United States Patent [19]

Shiramizu

[11] Patent Number: 4,912,711
[45] Date of Patent: Mar. 27, 1990

[54] DIAGNOSING APPARATUS CAPABLE OF READILY DIAGNOSING FAILURES OF A COMPUTER SYSTEM

[75] Inventor: Akira Shiramizu, Tokyo, Japan

[73] Assignee: NEC Corporation, Tokyo, Japan

[21] Appl. No.: 147,528

[22] Filed: Jan. 25, 1988

[30] Foreign Application Priority Data

Jan. 26, 1987 [JP] Japan .................................. 62-15601

[51] Int. Cl.$^4$ .............................................. G06F 11/00
[52] U.S. Cl. .................................... 371/16.1; 371/29.1
[58] Field of Search ....................... 371/16, 17, 15, 23, 371/29, 19, 18, 15.1, 16.1, 16.5, 29.1; 324/73 R, 73 AT

[56] References Cited

U.S. PATENT DOCUMENTS

| | | | |
|---|---|---|---|
| 3,575,589 | 4/1971 | Neema | 371/17 X |
| 3,939,453 | 2/1976 | Schroeder | 371/17 X |
| 4,135,662 | 1/1979 | Dlugos | 371/29 |
| 4,434,489 | 2/1984 | Blyth | 371/29 |
| 4,630,191 | 12/1986 | Strosser | 371/17 X |
| 4,654,852 | 3/1987 | Bentley | 371/16 X |
| 4,766,595 | 8/1988 | Gollomp | 371/15 X |

*Primary Examiner*—Jerry Smith
*Assistant Examiner*—Robert W. Beausoliel
*Attorney, Agent, or Firm*—Foley & Lardner, Schwartz, Jeffery, Schwaab, Mack, Blumenthal & Evans

[57] ABSTRACT

For use in a computer system for individually diagnosing various failures and obtaining counterplanes for the failures, a diagnosing device comprises a memory, an editing unit, and a matching unit. Feature information signal representative of features of the failures and counterplan information signals indicative of counterplans for the failures are preliminarily stored in the memory as memorized feature signals and as memorized counterplan signals in correspondence to the respective memorized feature signals. Responsive to an operation information signal produced by the computer system to represent a state of operation which the computer system has or had upon occurrence of each failure, the editing unit produces an edited signal identical with one of an failure information signals that represents the feature of failure in the state represented by the operation information signal. As a located feature signal, the matching unit locates in response to the edited signal one of a memorized feature signals that matches the edited signal. As a located counterplan signal, the matching unit concurrently produces one of the memorized counterplan signals that corresponds to the located feature signal. The located feature and counterplan signals are collectively used as a device output signal, which may be virtually displayed or printed on a sheet of paper as a result of diagnosis of the failure under consideration together with the counterplan for the failure in question.

4 Claims, 3 Drawing Sheets

```
            ((( FAILURE INFORMATION )))

FAILURE ADDRESS : X X X X

FAILURE MODULE, NAME :

REGISTER : B 0 : X X    B 1 : X X    B 2 : X X    B 3 : X X

B 4 : X X    B 5 : X X    B 6 : X X    B 7 : X X

G 0 : X X    G 1 : X X    G 2 : X X    G 3 : X X

G 4 : X X    G 5 : X X    G 6 : X X    G 7 : X X

X 0 : X X    X 1 : X X    X 2 : X X    X 3 : X X

COUNTERPLAN : This is a failure identical with
              the failure of the management
              number XXXX which occurred on
              the date of XXX.
              Please, apply the patch of No. XXX.
```

FIG. 3

DIAGNOSING APPARATUS CAPABLE OF READILY DIAGNOSING FAILURES OF A COMPUTER SYSTEM

BACKGROUND OF THE INVENTION

This invention relates to a diagnosing apparatus for use in a computer system in diagnosing various failures which might occur in the computer system.

A diagnosing apparatus of the type described, comprises a diagnosing device for individually diagnosing a plurality of failures of a computer system to produce a device output signal which separately represents results of diagnosis of the respective failures. In the computer system, the failures are liable to occur in a plurality of states of operation of the computer system. The failures compel the computer system to suspend operation of the computer system. Such failures are, for example, the so-called exceptions, namely, occurrences of unexpected actions, such as an overflow error, or of expected actions, such as an end of file, that occur at unpredictable instants of time.

In the manner known in the art, the computer system comprises a main storage and a save area which may be prepared in an external storage. When one of the failures occurs, the computer system suspends operation thereof immediately after saving a content of the main storage in the save area as a saved signal. The saved signal is representative of one of the states of operation that the computer system has or had at an instant of occurrence of the failure in question. Therefore, the saved signal will be called an operation information signal. Thus, a combination of the main storage and the save area acts as a signal producing arrangement for producing the operation information signal representative of one of the states of operation that the computer system has or had at an instant of occurrence of each of the failures.

When the computer system suspends operation thereof, the diagnosing apparatus is manually or otherwise activated. When activated, the diagnosing apparatus makes the diagnosing device start diagnosing operation to diagnose the failure by the use of the operation information signal received from the signal producing arrangement.

Although a conventional diagnosing apparatus comprises a diagnosing device for diagnosing the failure in response to the operation information signal, the diagnosing device executes only editing operation to edit the operation information signal into a feature information signal which represents a feature of the failure. The diagnosing device thereby produces the feature information signal as a device output signal which represents a result of diagnosis of the failure. In other words, the diagnosing device carries out only extracting operation of the feature information signal from the operation information signal.

A user of the computer system is therefore compelled to investigate the cause of the failure by analyzing the feature information signal. In addition, the user is compelled to form a counterplan for recovery from the failure and for prevention of occurrence of the failure. The user can not put the counterplan into action before formation of the counterplan.

Inasmuch as the user must form such a counterplan whenever each of the failures occurs in the computer system, much time and a great deal of labor must be consumed whenever the failure occurs. Furthermore, analysis of the failures requires competence of the user. Qualification of the user is therefore restricted to those conversant with the analysis of the failure. Thus, the conventional diagnosing apparatus is incapable of readily diagnosing the failures of the computer system.

SUMMARY OF THE INVENTION

It is therefore an object of this invention to provide a diagnosing apparatus which is capable of readily diagnosing failures of a computer system.

It is another object of this invention to provide a diagnosing apparatus of the type described, which is capable of saving time and labor in obtaining a counterplan for each of the failures.

It is still another object of this invention to provide a diagnosing apparatus of the type described, which is capable of analyzing each of the failures without need of competence of a user of the computer system.

It is yet another object of this invention to provide a diagnosing apparatus of the type described, which is capable of automatically analyzing each of the failures to thereby obtain a counterplan for the failure in question.

Other objects of this invention will become clear as the description proceeds.

According to this invention, there is provided a diagnosing apparatus which is for use in a computer system and which comprises a diagnosing device for individually diagnosing a plurality of failures to produce a device output signal separately representing results of diagnosis of the respective failures. The failures are liable to occur in a plurality of states of operation of the computer system and having features which a plurality of feature information signals represent. The computer system comprises signal producing means for producing an operation information signal representative of one of the states of operation that the computer system has at an instant of occurrence of each of the failures. The diagnosing device comprises: (1) memorizing at least one of means for memorizing the feature information signals, as a memorized feature signal and at least one of counterplan information signals as a memorized counterplan signal in correspondence to the the memorized feature signal, the counterplan information signals representing counterplans for the respective failures; (2) writing means coupled to the memorizing means for writing at least one of the feature information signals as a memorized feature signal and at least one of the counterplan information signals as the memorized counterplan signal in the memorizing means whenever each of the failures occurs; (3) editing means coupled to the signal producing means for editing the operation information signal into an edited signal which is identical with one of the feature information signals that represents the feature of the failure in the above-mentioned one of the states of operation; and (4) judging means coupled to the editing means and to the memorizing means and responsive to the edited signal for judging whether or not the edited signal is memorized in the memorizing means as the memorized feature signal, the judging means producing a combination of the edited signal and the memorized counterplan signal corresponding to the edited signal as the device output signal only when the edited signal is memorized in the memorizing means.

BRIEF DESCRIPTION OF THE DRAWING

FIG. 3 exemplifies a result of diagnosis of a failure with the result displayed on a visual display unit which is for use in the diagnosing apparatus illustrated in FIG. 1.

DESCRIPTION OF THE PREFERRED EMBODIMENTS

Figure 1:
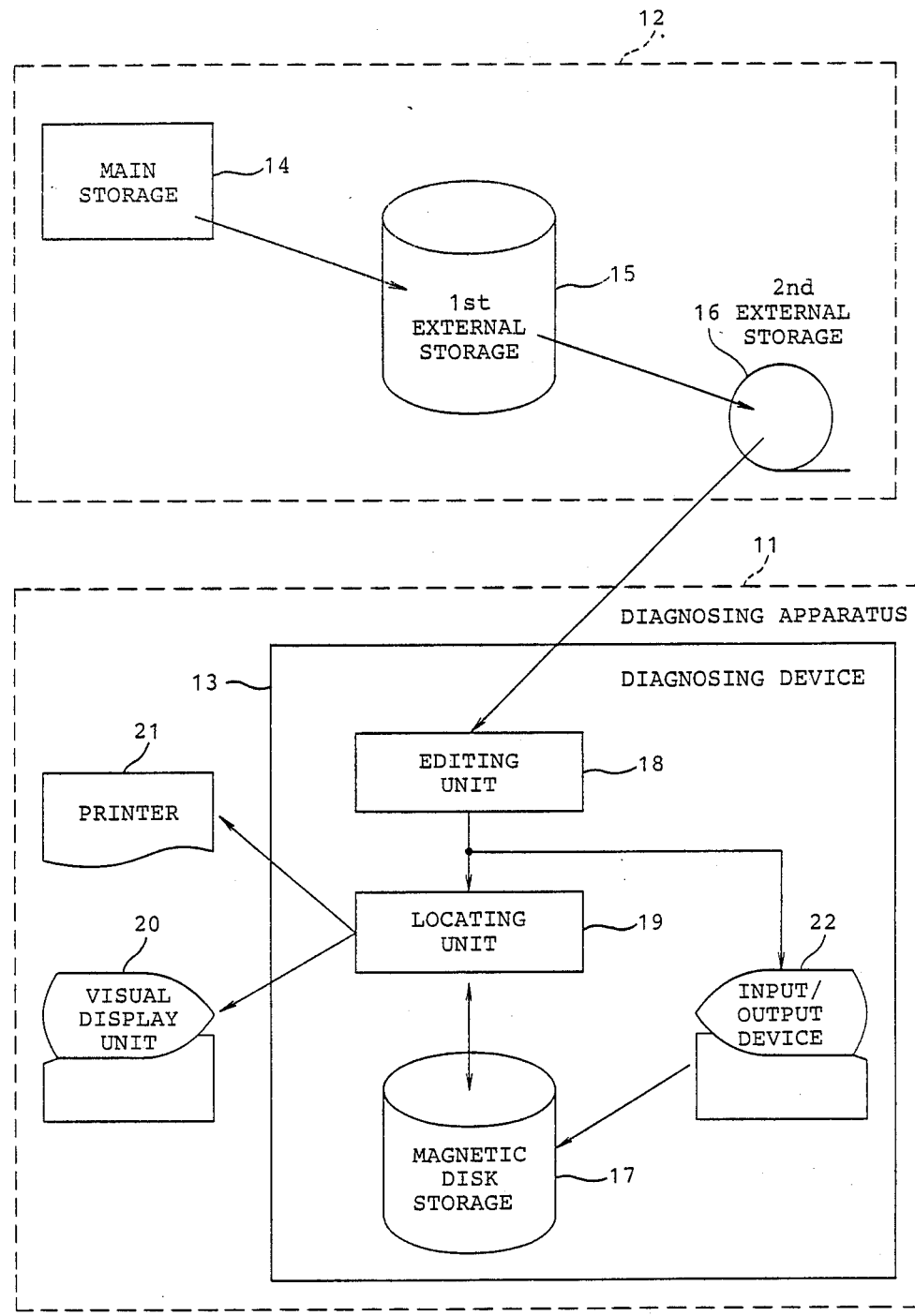
FIG. 1 shows in blocks a diagnosing apparatus according to an embodiment of this invention together with a computer system.

Referring to FIG. 1, a diagnosing apparatus 11 according to a preferred embodiment of this invention is for use in a computer system 12. The diagnosing apparatus 11 comprises a diagnosing device 13 for individually diagnosing a plurality of failures to produce a device output signal which separately represents results of diagnosis of the respective failures.

The failures are liable to occur in a plurality of states of operation of the computer system 12. The failures compel the computer system 12 to suspend operation of the computer system 12. For example, such failures are known in the art as various kinds of exceptions which are liable to occur in the computer system 12. The failures have features which a plurality of feature information signals represent.

The computer system 12 comprises a central processing unit (not shown) comprising various registers (not shown) which are known in the art. The computer system 12 further comprises a main storage 14 and first and second external storages 15 and 16. In the example being illustrated, the first and the second external storages 15 and 16 are a magnetic disk storage and a magnetic tape storage, respectively.

On occurrence of one of the failures, the computer system 12 saves a content of the main storage 14 in the first external storage 15 as a first saved signal and then suspends operation thereof. When the computer system 12 is again started or restarted, the first saved signal is saved or retained in the second external storage 16 as a second saved signal. In the manner known in the art, the second saved signal is representative of one of the states of operation that the computer system 12 has or had at an instant of occurrence of the failure in question. The second saved signal is therefore referred to as an operation information signal. Thus, a combination of the main storage 14 and the first and the second external storages 15 and 16 serves as a signal producing arrangement for producing the operation information signal representative of one of the states of operation that the computer system 12 has or had at an instant of occurrence of each of the failures.

After the operation information signal is saved in the magnetic tape storage 16, the diagnosing apparatus 11 is manually activated by a user of the computer system 12. Alternatively, the diagnosing apparatus 11 may be automatically activated after the operation information signal is saved in the magnetic tape storage 16. When activated, the diagnosing apparatus 11 makes the diagnosing device 13 start diagnosing operation to diagnose the failure in question by the use of the operation information signal and to thereby produce the device output signal representing the result of diagnosis of the failure in question.

The diagnosing device 13 comprises a magnetic disk storage 17 which is operable as a memorizing unit for memorizing the feature information signals as memorized feature signals and a plurality of counterplan information signals as memorized counterplan signals in correspondence to the respective memorized feature signals. The counterplan information signals represent counterplans for the respective failures as counterplan information. Other magnetic storage, such as a magnetic drum storage, a magnetic tape storage, or the like may be used as the memorizing unit.

The diagnosing device 13 further comprises an editing unit 18 coupled to the magnetic tape storage 16 of the signal producing arrangement. Responsive to the operation information signal, the editing unit 18 edits the operation information signal into an edited signal which is identical with one of the feature information signals that represents the feature of the failure in the above-mentioned one of the states of operation.

A locating unit or judging unit 19 is coupled to the editing unit 18 and to the magnetic tape storage 17. Responsive to the edited signal, the locating unit 19 locates one of the memorized feature signals as a located feature signal. This one of the memorized feature signals is that one of the feature information signals with which the edited signal is identical. The locating unit 19 furthermore locates one of the memorized counterplan signals as a located counterplan signal. This one of the memorized counterplan signals corresponds to the located feature signal. The locating unit 19 thereby produces a combination of the located feature signal and the located counterplan signal as the device output signal.

The diagnosing apparatus 11 further comprises a visual display unit 20 coupled to the locating unit 19. Responsive to the combination of the located feature signal and the located counterplan signal, the visual display unit 20 visually displays the feature represented by the above-mentioned one of the feature information signals and the counterplan represented by one of the counterplan information signals that is memorized in the magnetic disk storage 17 as the located counterplan signal.

A printer 21 is coupled to the locating unit 19. The printer 21 is also responsive to the combination of the located feature signal and the located counterplan signal for printing the feature represented by the above-mentioned one of the feature information signals and the counterplan represented by one of the counterplan information signals that is memorized in the magnetic disk storage 17 as the located counterplan signal.

Thus, the diagnosing device 13 automatically produces not only the located feature signal but also the located counterplan signal in the diagnosing apparatus 11. It is therefore possible to save time and labor in obtaining a counterplan for each of the failures. Competence of the user is not required in obtaining the counterplan.

Before the diagnosing device 13 carries out the above-mentioned diagnosing operation of the failures, it is necessary to preliminarily write the feature information signals and the counterplan information signals in the magnetic disk storage 17. For this purpose, an input/output device or writing device 22 is manually activated by the user. The input/output device 22 is coupled to the editing unit 18 and to the magnetic disk storage 17. When a failure occurs in the computer system 12, the editing unit 18 produces an edited signal in the manner similar to the diagnosing operation. Responsive to the edited signal, the input/output device 22 displays, as a displayed feature, one of the feature information signals that is represented by the edited signal.

With reference to the displayed feature, the user forms the counterplan for the displayed feature. The user inputs the counterplan in the input/output device 22. As a result, the counterplan information signal representative of the counterplan is written in the magnetic disk storage 17. The feature information signal represented by the edited signal is also written in the magnetic disk storage 17. Whenever each of the failure occurs, similar writing operation is carried out. Thus, the input/output device 22 is operable as a writing device coupled to the magnetic disk storage 17 for preliminarily writing the plurality of feature information signals as the memorized feature signals and the plurality of counterplan information signals as the memorized counterplan signals in the magnetic disk storage 17 before the diagnosing device 13 diagnoses the plurality of failures.

In the computer system 12, a particular failure may repeatedly take place. It should therefore be understood that the feature information signals are representative of the features of different ones of the failures. Such different failures will now be referred to merely as failures for the brevity of description.

Figure 2:
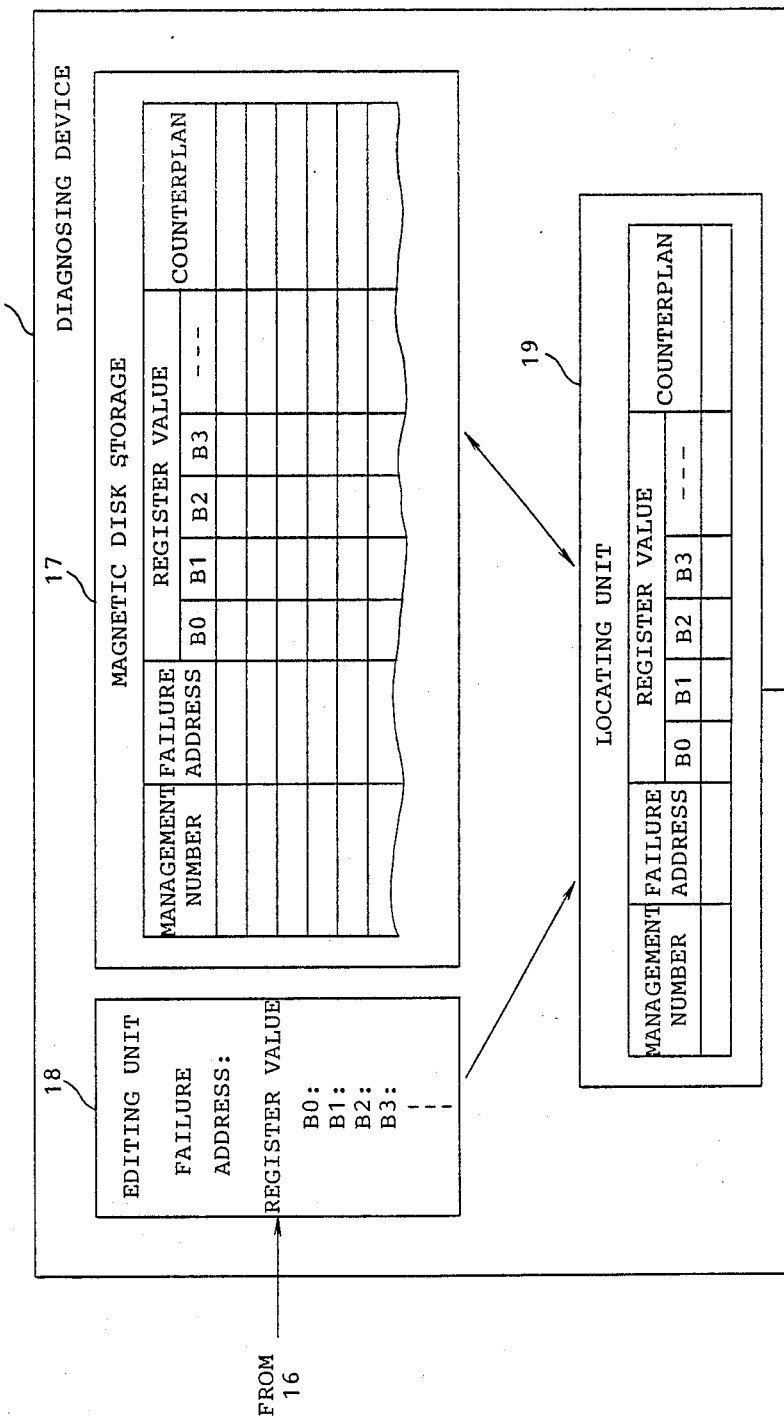
FIG. 2 is a diagram for use in describing operation of a diagnosing device which is for use in the diagnosing apparatus illustrated in FIG. 1.

Referring to FIG. 2, each memorized feature signal represents a management number for each failure, a failure address of the main storage 14 (FIG. 1) for the failure, register values at the instant of occurrence of the failure, and a counterplan for the failure. The memorized feature signal may furthermore represent a state of a control table of the main storage 14 on occurrence of the failure. The management numbers are for the respective failures and are consecutive numbers. The failure address is an address of the main storage 14 of storage of an instruction which the central processing unit of the computer system 12 (FIG. 1) executes on occurrence of each failure. The register values are values which the registers have in the central processing unit on occurrence of each failure. The counterplan comprises an advice message for recovery from each failure and for prevention of occurrence of the failure. It is to be noted here that the feature, as herein called, is a combination of the failure address and the register values at the instant of occurrence of the failure.

The editing unit 18 edits the operation information signal received from the second external storage 16 into an edited signal when a failure occurs in the computer system 12 (FIG. 1). The edited signal is representative of the failure address relating to the failure and the register values which the registers of the central processing unit has or had on occurrence of the failure.

Responsive to the edited signal, the locating unit 19 compares the failure address of the feature information signal defined by the edited signal with each of the failure addresses of the memorized feature signals. When both failure addresses are coincident with each other, the locating unit 19 furthermore compares a combination of the register values of the feature information signal defined by the edited signal with each of a plurality of combinations of the register values of the memorized feature signals. When both are coincident with each other, the locating unit 19 reads out of the magnetic disk storage 17 one of the memorized feature signals which is coincident with the feature information signal defined by the edited signal. The locating unit 19 may therefore be referred to alternatively as a matching unit.

Furthermore, the locating unit 19 reads out of the magnetic disk storage 17 the memorized counterplan signal which is positioned at the same address as the memorized feature signal read out of the magnetic disk storage 17. Thus, the locating unit 19 produces not only a located feature signal representative of the failure address and the register values but also a located counterplan signal representative of the counterplan in the manner described above.

Responsive to the located feature and counterplan signals, the visual display unit 20 displays a display representative of the feature of the failure and of the counterplan for the failure. An example of the display is illustrated in FIG. 3.

As is obvious from FIG. 3, the feature is displayed as a combination of the failure address and the register values. The counterplan information is displayed as a displayed counterplan representative of, for example, "This is a failure identical with the failure of the management number XXXX which occurred on the date of XXX. Please, apply the patch of No. XXX." With reference to the displayed counterplan, the user can make use of the counterplan information so as to cope with the failure and to prevent repeated occurrence of the failure.

The device output signal may delivered to the printer 21 (FIG. 1). In this event, the device output signal may or may not delivered also to the visual display unit 20 (FIG. 1). When supplied with the device output signal, the printer 21 prints the feature of the failure and the counterplan information for the failure in the manner exemplified in FIG. 3.

While this invention has thus far been described in conjunction with a preferred embodiment thereof, it will readily be possible for those skilled in the art to put this invention into practice in various other manners. For example, the editing unit 18 may comprise another input/output device so that editing operation can be carried out by the user on writing the feature information signal in the magnetic disk storage 17. After writing the feature information signal, the editing unit 18 automatically carries out editing operation without intervention of the user.

What is claimed is:

1. A diagnosing apparatus which is for use in a computer system and which comprises a diagnosing device for individually diagnosing a plurality of failures to produce a device output signal separately representing results of diagnosis of the respective failures, said failures being liable to occur in a plurality of states of operation of said computer system and having features which a plurality of feature information signals represent, said computer system comprising signal producing means for producing an operation information signal representative of one of said states of operation that said computer system has at an instant of occurrence of each of said failures, said diagnosing device comprising:
  memorizing means for memorizing at least one of said feature information signals as a memorized feature signal and at least one of counterplan information signals as a memorized counterplan signal in correspondence to said memorized feature signal, said counterplan information signals representing counterplans for the respective failures;
  writing means coupled to said memorizing means for writing said at least one of said feature information signals as said memorized feature signal and said at least one of said counterplan information signals as said memorized counterplan signal in said memorizing means whenever each of said failures occurs;

editing means coupled to said signal producing means for editing said operation information signal into an edited signal which is identical with one of said feature information signals that represents the feature of the failure in said one of the states of operation; and judging means couples to said editing means and to said memorizing means and responsive to said edited signal for judging whether or not said edited signal is memorized in said memorizing means as said memorized feature signal, said judging means producing a combination of said edited signal and the memorized counterplan signal corresponding to said edited signal as said device output signal only when said edited signal is memorized in said memorizing means.

2. A diagnosing apparatus as claimed in claim 1, further comprising visual display means coupled to said locating means and responsive to the combination of said located feature signal and said located counterplan signal for visually displaying the feature represented by said one of the feature information signals and the counterplan represented by one of the counterplan information signals that is memorized in said memorizing means as said located counterplan signal.

3. A diagnosing apparatus as claimed in claim 1, further comprising printing means coupled to said locating means and responsive to the combination of said located feature signal and said located counterplan signal for printing the feature represented by said one of the feature information signals and the counterplan represented by one of the counterplan information signals that is memorized in said memorizing means as said located counterplan signal.

4. A diagnosing apparatus as claimed in claim 1, wherein said plurality of failures are a plurality of exceptions which are liable to occur in said plurality of the states of operation of said computer system and which have the respective features.

* * * * *